(12) United States Patent
Takahashi et al.

(10) Patent No.: US 10,645,288 B2
(45) Date of Patent: May 5, 2020

(54) MONITORING CAMERA SYSTEM AND MONITORING METHOD

(71) Applicant: Panasonic Intellectual Property Management Co., Ltd., Osaka (JP)

(72) Inventors: Takeshi Takahashi, Fukuoka (JP); Daisuke Wakeyama, Fukuoka (JP); Takanobu Machida, Fukuoka (JP); Yuichi Sasaki, Fukuoka (JP); Yoko Oie, Fukuoka (JP); Koji Yamaguchi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 86 days.

(21) Appl. No.: 16/121,134

(22) Filed: Sep. 4, 2018

(65) Prior Publication Data

US 2019/0082115 A1    Mar. 14, 2019

(30) Foreign Application Priority Data

Sep. 14, 2017    (JP) .................................. 2017-176884

(51) Int. Cl.
*H04N 5/232* (2006.01)
*H04N 7/18* (2006.01)
(Continued)

(52) U.S. Cl.
CPC . *H04N 5/232411* (2018.08); *G08B 13/19639* (2013.01); *G08B 13/19643* (2013.01);
(Continued)

(58) Field of Classification Search
CPC ............ G08B 13/19669; G08B 29/185; G08B 13/19639; G08B 13/19643;
(Continued)

(56) References Cited

U.S. PATENT DOCUMENTS 8,564,661 B2 * 10/2013 Lipton ............. G08B 13/19608
348/143
9,948,902 B1 * 4/2018 Trundle ................. H04N 7/183
(Continued)

FOREIGN PATENT DOCUMENTS

JP    2009-237648 A    10/2009

*Primary Examiner* — Nathnael Aynalem
(74) *Attorney, Agent, or Firm* — Seed IP Law Group LLP

(57) ABSTRACT

A first camera sends a first detection notification to a master device when detecting a person in a first imaging area, and starts transmission of a captured video of the first imaging area to the master device by shifting an operation mode from a sleep mode to a standby mode. The master device notifies a camera other than the first camera of a shift instruction to the standby mode in accordance with the first detection notification. The other camera shifts the operation mode from the sleep mode to the standby mode in accordance with the shift instruction to the standby mode, and starts buffering of a captured video of a second imaging area, and when detecting the person in the second imaging area in the standby mode, the other camera sends a second detection notification of the person to the master device, and starts transmission of the captured video of the second imaging area buffered before a first predetermined time period after a point of time at which the person is detected in the second imaging area, to the master device.

7 Claims, 8 Drawing Sheets

(51) Int. Cl.
*H04N 5/247* (2006.01)
*G08B 13/196* (2006.01)
*G08B 25/10* (2006.01)

(52) U.S. Cl.
CPC ....... *G08B 13/19656* (2013.01); *G08B 25/10* (2013.01); *H04N 5/23206* (2013.01); *H04N 5/23245* (2013.01); *H04N 5/232061* (2018.08); *H04N 5/247* (2013.01); *H04N 7/181* (2013.01); *H04N 7/188* (2013.01)

(58) Field of Classification Search
CPC .............. G08B 13/19656; G08B 25/10; H04N 5/23206; H04N 5/23241; H04N 7/181; H04N 7/188; H04N 5/232061; H04N 5/232411; H04N 5/23245; H04N 5/247; H04N 5/232; H04N 5/222; H04N 5/225
USPC .......................................... 348/143, 152–159
See application file for complete search history.

(56) References Cited

U.S. PATENT DOCUMENTS

| | | | |
|---|---|---|---|
| 2006/0203090 A1* | 9/2006 | Wang | G06K 9/209 348/143 |
| 2007/0064107 A1* | 3/2007 | Aggarwal | G01S 3/7864 348/143 |
| 2011/0310219 A1* | 12/2011 | Kim | G08B 13/19643 348/36 |
| 2014/0085480 A1* | 3/2014 | Saptharishi | G06F 16/71 348/159 |
| 2016/0105406 A1* | 4/2016 | Smith | H04W 76/14 713/171 |
| 2019/0020820 A1* | 1/2019 | Kaneko | H04N 9/8205 |

* cited by examiner

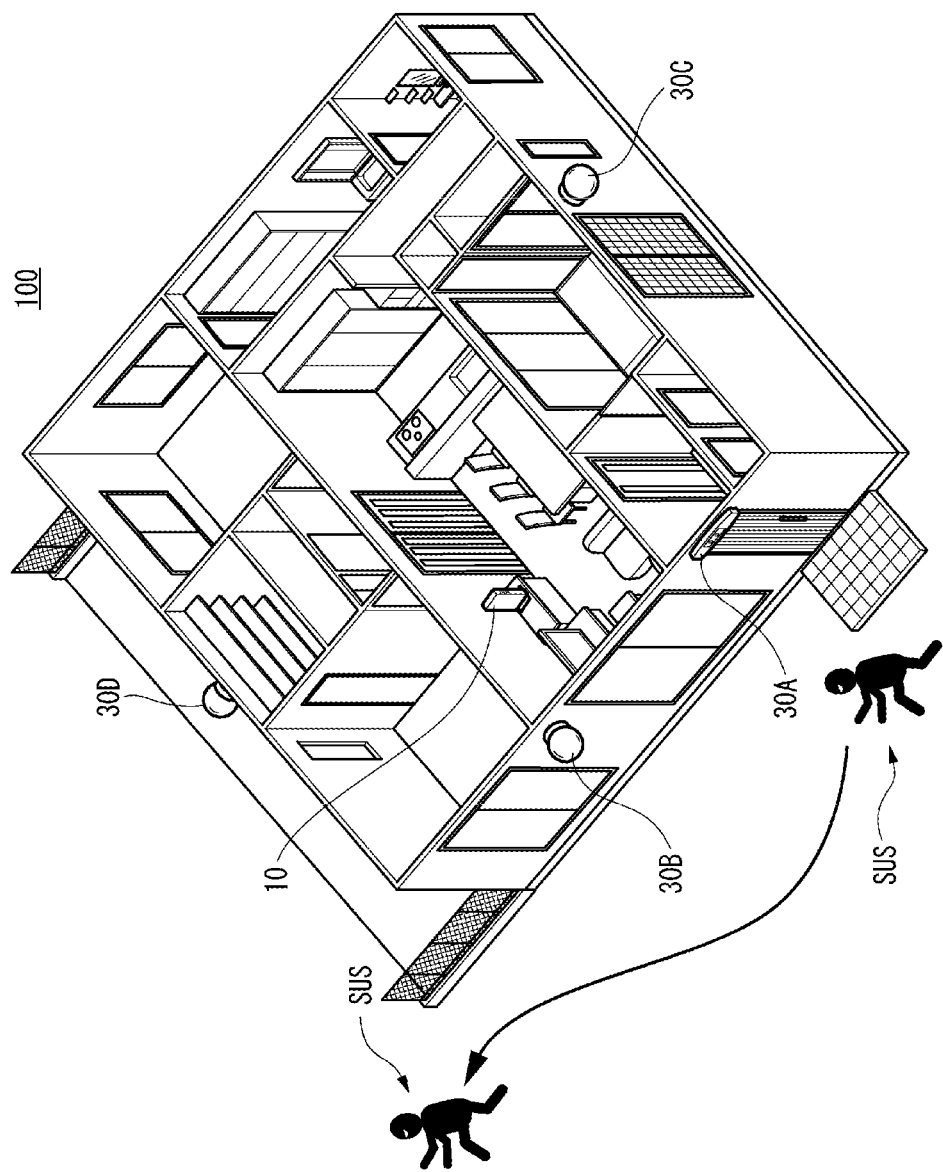

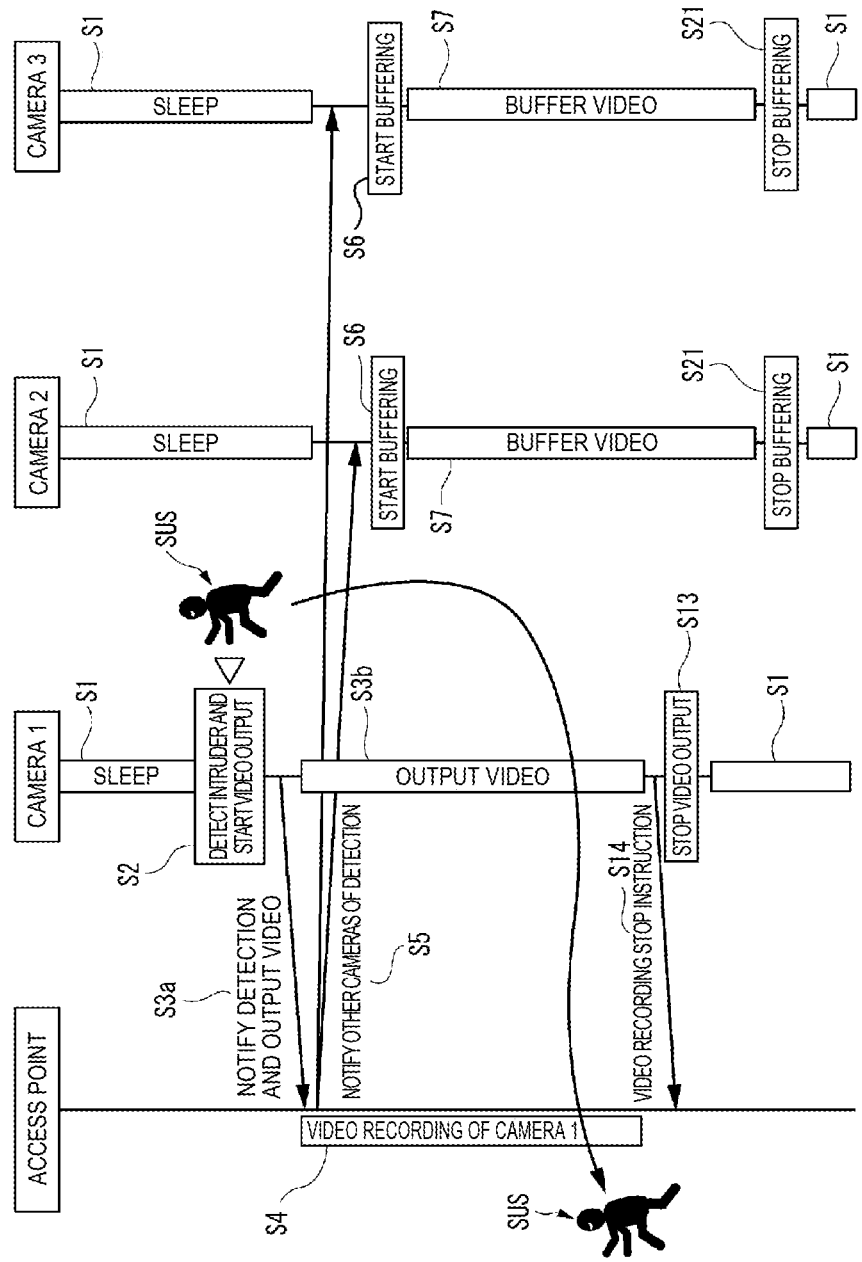

MONITORING CAMERA SYSTEM AND MONITORING METHOD

BACKGROUND

1. Technical Field

The present disclosure relates to a monitoring camera system including, for example, one or more cameras which detect movement of a person, and a monitoring method using the monitoring camera system.

2. Description of the Related Art

In recent years, as a part of home security, a monitoring camera system in which, for example, one or more security cameras (that is, monitoring cameras) are installed in or around an individual house, and in a case where a person (for example, a visitor or a suspicious person) is taken in a video captured by each of the security cameras, the video is recorded, is realized.

Japanese Patent Unexamined Publication No. 2009-237648 discloses an operator safety inspection apparatus which performs safety inspection of an operator by determining abnormality in a case of detecting a state where the operator who moves onto an image has stopped for a certain period of time or more by image processing for the purpose of performing safety inspection of the operator who performs an independent work at an indoor work site. However, in the above-described Japanese Patent Unexamined Publication No. 2009-237648, similar to the monitoring camera system of the above-described home security, monitoring of a person (for example, a visitor or a suspicious person) who has approached the individual house using the videos captured by each of the plurality of monitoring cameras is not considered. Here, an example in which the technology described in the above-described Patent Literature is applied to the monitoring camera system of the above-described home security is assumed. In this case, for example, since each of the monitoring cameras constantly performs imaging regardless of the time zone in which the person who approaches the individual house is present and the time zone in which the person who approaches the house is not present, there is a problem that the power consumption of all of the monitoring cameras increases. In particular, in a case where the monitoring camera is operated by battery driving, frequent replacement of the battery is forced due to an increase in power consumption amount, and usability as a monitoring camera system is not excellent.

SUMMARY

The disclosure is devised in view of the above-described situation of the related art, and an object of the disclosure is to provide a monitoring camera system and a monitoring method which control each of a plurality of monitoring cameras so as to activate each of the monitoring cameras when monitoring is necessary without constantly operating each of the plurality of monitoring cameras, and improve usability by performing efficient monitoring while reducing the power consumption of all of the monitoring cameras.

According to the disclosure, there is provided a monitoring camera system in which a plurality of cameras and a master device which controls an operation mode of each of the cameras are capable of communicating with each other, in which a first camera among the plurality of cameras sends a first detection notification of a person to the master device when detecting the person in a first imaging area, and starts transmission of a captured video of the first imaging area to the master device by shifting the operation mode from a sleep mode to a standby mode, in which the master device notifies a camera other than the first camera among the plurality of cameras of a shift instruction to the standby mode in accordance with the first detection notification sent from the first camera, and in which the other camera shifts the operation mode from the sleep mode to the standby mode in accordance with the shift instruction to the standby mode sent from the master device, and starts buffering of a captured video of a second imaging area, and when detecting the person in the second imaging area in the standby mode, the other camera sends a second detection notification of the person to the master device, and starts transmission of the captured video of the second imaging area including the captured video buffered before a first predetermined time period after a point of time at which the person is detected in the second imaging area, to the master device.

According to the disclosure, it is possible to control each of a plurality of monitoring cameras so as to activate each of the monitoring cameras when monitoring is necessary without constantly operating each of the plurality of monitoring cameras, and to improve usability by performing efficient monitoring while reducing the power consumption of all of the monitoring cameras.

BRIEF DESCRIPTION OF DRAWINGS

FIG. 6A is an explanatory view illustrating an example of an intrusion path when the suspicious person does not approach the other cameras and goes away from the individual house after approaching the imaging area of camera 1; and FIG. 6B is a sequence view illustrating an example of an operation order of the access point and each of the cameras which correspond to the intrusion path of the suspicious person illustrated in FIG. 6A.

DETAILED DESCRIPTION

Hereinafter, an embodiment (hereinafter, referred to as the embodiment) in which a monitoring camera system and a monitoring method according to the disclosure are specifically disclosed will be described in detail with reference to the appropriate drawings. However, there is a case where description detailed more than necessary is omitted. For example, there is a case where detailed descriptions of already well-known matters and redundant descriptions on substantially the same configuration are omitted. This is to avoid the unnecessary redundancy of the following description and to make it easy to understand the disclosure for those skilled in the art. In addition, the attached drawings and the following description are provided to enable those skilled in the art to fully understand the disclosure, and are not intended to limit the subject matter described in the claims.

The monitoring camera system according to the embodiment has, for example, a configuration in which a plurality of monitoring cameras are installed within a site (for example, including an indoor space or an outdoor space, such as a garden and a garage, within the site) of a house (that is, an individual house) of a user of the monitoring camera system (hereinafter, abbreviated as "user"). However, the monitoring camera system according to the embodiment is not limited to security applications within the site of the individual house of the user, and for example, the monitoring camera system may be used as security application in any place of business, such as shops, factories, or offices.

In addition, the disclosure is not limited to the monitoring camera system, can also be expressed as a monitoring camera method using the monitoring camera system, and can also be defined as a category of a device which is an access point or a monitoring camera that configures the monitoring camera system or a category of a program for causing the access point or the monitoring camera to execute different types of predetermined processing respectively.

Figure 1:
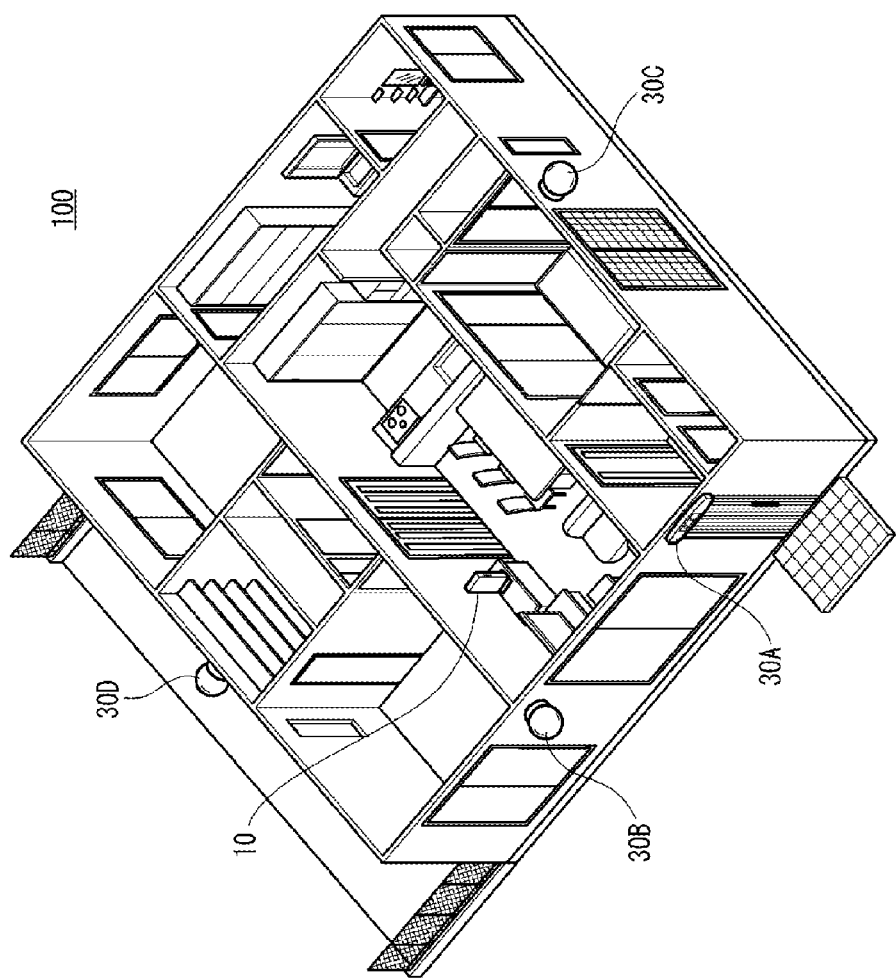
FIG. 1 is a view illustrating a layout example in which an access point and cameras which configure a monitoring camera system according to an embodiment are installed in an individual house of a user.
Figure 2:
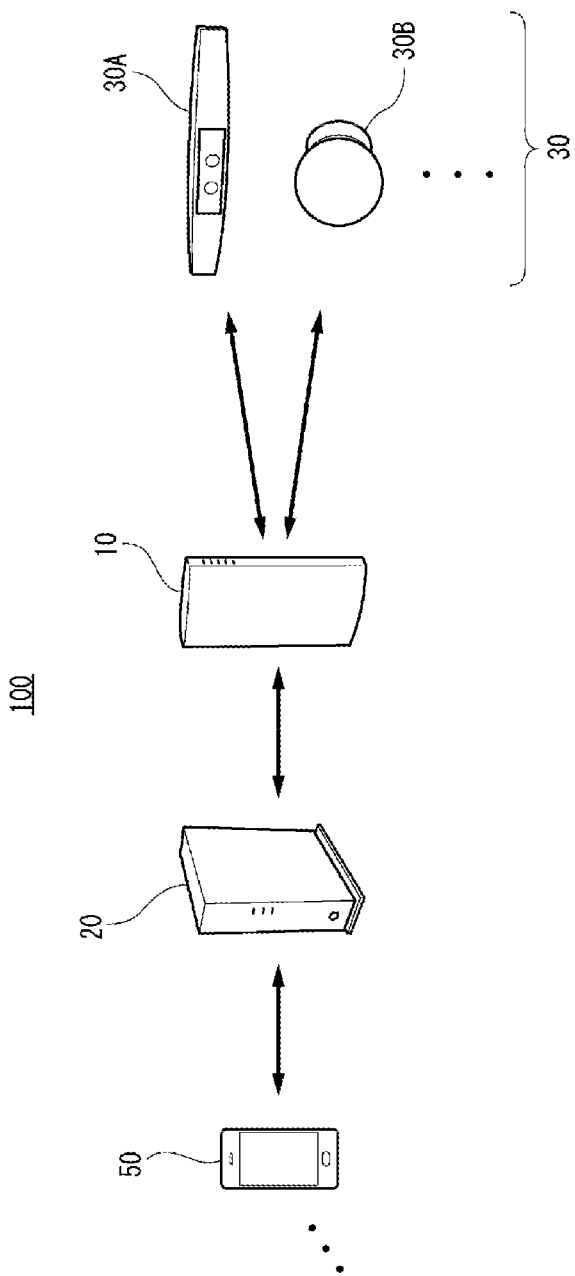
FIG. 2 is a view illustrating a system configuration example of the monitoring camera system according to the embodiment.

FIG. 1 is a view illustrating a layout example in which access point 10 and cameras 30A, 30B, 30C, and 30D which configure monitoring camera system 100 according to the embodiment are respectively installed within the individual house of the user. FIG. 2 is a view illustrating a system configuration example of monitoring camera system 100 according to the embodiment. Monitoring camera system 100 is installed, for example, within the individual house of the user, and has a configuration in which router 20 which is wirelessly connected to smartphone 50 and a plurality of cameras 30A, 30B, 30C, and 30D are connected to each other via access point 10 so as to communicate with each other. In FIG. 1, smartphone 50 and router 20 are omitted.

Access point 10 (an example of a master device) has a role as a gateway related to communication between various devices that configure monitoring camera system 100 (refer to FIG. 2). In other words, access point 10 is a control device which controls the overall operation of monitoring camera system 100, is wirelessly connected to camera 30, for example, using a wireless LAN (Local Area Network), such as Wifi (registered trademark, and is wire-connected to router 20 using a wired LAN.

Access point 10 has a function of controlling operation modes of a plurality of cameras 30 and a function of recording data of captured videos captured by each of cameras 30. The operation mode is a mode that defines the operation state of camera 30, and includes, for example, a sleep mode and a standby mode. The sleep mode is a state where the operation of each part other than infrared sensor 313 at each part (refer to FIG. 4) of camera 30 is temporarily stopped. The standby mode is a state where each part of camera 30 including infrared sensor 313 is operable.

Router 20 is wire-connected to access point 10 using the wired LAN, such as Ethernet (registered trademark), and is wirelessly connected to smartphone 50 using the wireless LAN, such as Wifi (registered trademark). Router 20 performs relay processing of data or information between the plurality of cameras 30 and smartphone 50 or between access point 10 and smartphone 50. Router 20 configures monitoring camera system 100, and is installed within the individual house of the user.

Four cameras 30A, 30B, 30C, and 30D are so-called monitoring cameras (security cameras), have a function of enabling calling and communicating with smartphone 50 via access point 10 and router 20, and are wirelessly connected to access point 10 using the wireless LAN. In FIG. 1, as cameras, for example, camera 30A for an entrance which images the entrance of the individual house as a main imaging area (an example of a first imaging area), and cameras 30B, 30C, and 30D which are installed on outer walls or the like of the individual house and respectively image the surrounding (for example, a garden or a garage) of the individual house as different imaging areas, are installed.

In addition, although not illustrated in FIG. 1, one or more cameras similar to 30A to 30D may be additionally installed in a predetermined place (for example, a corridor or a room) within the individual house. In the following description, in a case where it is not particularly necessary to distinguish the type of cameras 30A, 30B, 30C, and 30D, the cameras are collectively referred to as "camera 30".

For example, as illustrated in FIG. 1, camera 30A performs imaging so as to include the entrance of the individual house of the user as an imaging area in the standby mode. In other words, in the sleep mode, camera 30A does not image the imaging area of camera 30A in order to suppress an increase in power consumption.

Similarly, in the standby mode, camera 30B performs imaging so as to include the surrounding (for example, the whole outer wall part of a Japanese-style room) of the individual house of the user as an imaging area. In other words, in the sleep mode, camera 30B does not image the imaging area of camera 30B in order to suppress an increase in power consumption.

Similarly, in the standby mode, camera 30C performs imaging so as to include the surrounding (for example, the whole outer wall part of a living room) of the individual house of the user as an imaging area. In other words, in the sleep mode, camera 30C does not image the imaging area of camera 30C in order to suppress an increase in power consumption.

Similarly, in the standby mode, camera 30D performs imaging so as to include the surrounding (for example, the whole garden) of the individual house of the user as an imaging area. In other words, in the sleep mode, camera 30D does not image the imaging area of camera 30D in order to suppress an increase in power consumption.

In the embodiment, for example, in order to simplify attachment of each of cameras 30 that configure monitoring camera system 100 to the ceiling or the wall surface inside the individual house or the pole or the outer wall outside the individual house, cameras 30 are respectively configured by battery driving. In other words, although will be described in detail later with reference to FIG. 4, each part of camera 30 is supplied with electric power necessary for operation from battery 314, and is not supplied with constant electric power via an AC adapter or the like from a commercial power source. Therefore, when monitoring camera system 100 of the embodiment is specifically realized, since each of cameras 30 is driven by batteries, it is required that power consumption is suppressed such that power consumption of each of cameras 30 does not increase. Therefore, as described above, in a case where each of cameras 30 does not receive instructions from access point 10, for example, each of cameras 30 is in the sleep mode (that is, power saving mode) where the operation of each part other than infrared sensor 313 which will be described later is inactive. Therefore, camera 30 according to the embodiment considerably reduces the complexity of attaching camera 30 to the inside of the individual house of the user, compared to attachment in a case of being supplied with constant electric power from the commercial power source.

Since camera 30 is configured by battery driving, in a case where a shift instruction of the operation mode (for example, a shift instruction to the standby mode) is not received from access point 10, camera 30 sets the operation mode to the sleep mode. In other words, when receiving the shift instruction (for example, the shift instruction to the standby mode) of the operation mode from access point 10, camera 30 shifts the operation mode from the sleep mode to the standby mode. In addition, even when camera 30 does not receive the shift instruction (for example, the shift instruction to the standby mode) of the operation mode from access point 10, for example, in a case where a person or a movement is detected by infrared sensor 313 of camera 30 itself, the operation mode may be autonomously shifted from the sleep mode to the standby mode. Accordingly, in a case where camera 30 does not receive or cannot receive the shift instruction of the operation mode from access point 10, it is possible to autonomously shift the operation mode of camera 30 from the sleep mode to the standby mode, and to improve security of the individual house. On the contrary, in a case where infrared sensor 313 does not detect a person or movement for a certain period of time, camera 30 may autonomously shift the operation mode of camera 30 from the standby mode to the sleep mode. Accordingly, in a case where camera 30 does not receive or cannot receive the shift instruction of the operation mode from access point 10, it is possible to autonomously shift the operation mode of camera 30 from the standby mode to the sleep mode, and to achieve power saving.

Smartphone 50 is wirelessly connected to access point 10 locally (that is, within the individual house of the user) via router 20 (for example, a wireless router) using the wireless LAN. Accordingly, smartphone 50 can transmit and receive data or information (for example, a calling function and a communication function) with various cameras 30 installed in the individual house via router 20 and access point 10.

In addition, smartphone 50 is wirelessly connected to other mobile phones or smartphones via a broadband mobile telephone network (so-called a carrier network) using various wireless communication standards, such as 3G (third generation mobile communication system), 4G (fourth generation mobile communication system), or 5G (fifth generation mobile communication system). Therefore, smartphone 50 can transmit and receive data or information to and from other wirelessly connected mobile phones or smartphones via the broadband mobile telephone network.

Figure 3:
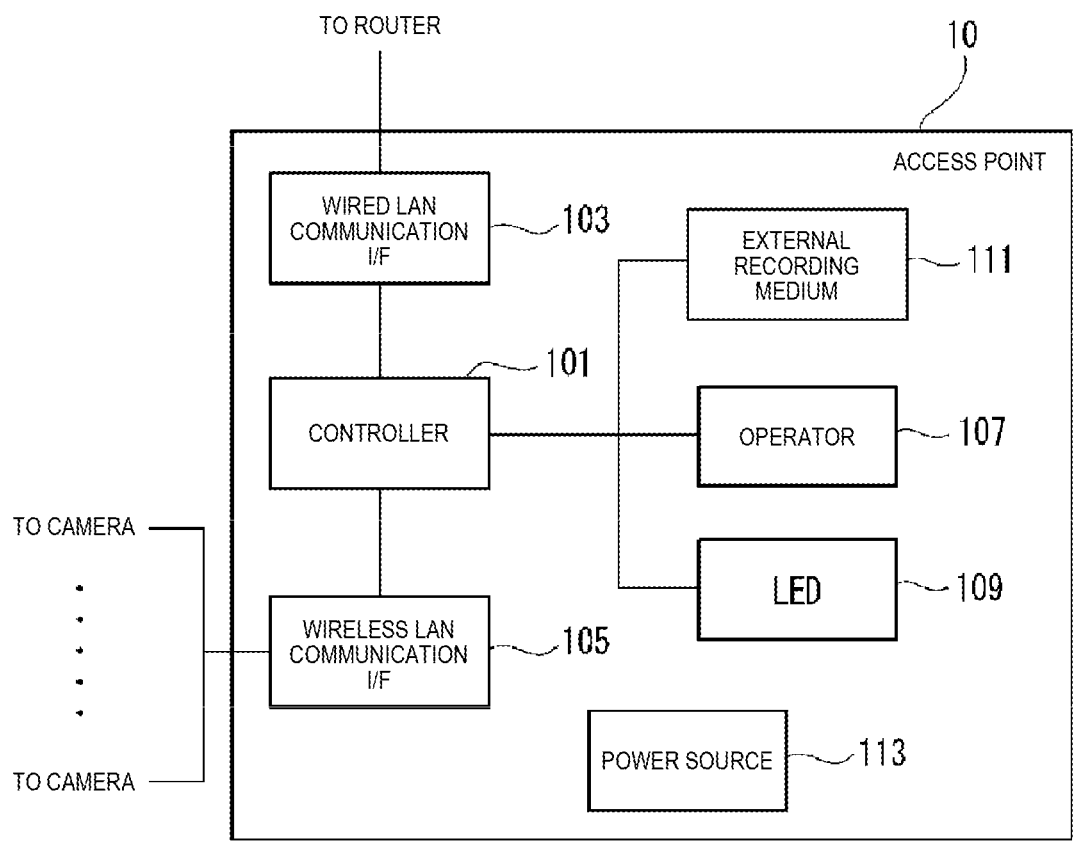
FIG. 3 is a block diagram illustrating an example of an inner configuration of the access point.

FIG. 3 is a block diagram illustrating an example of an inner configuration of access point 10. Access point 10 includes controller 101, wired LAN communication I/F 103, wireless LAN communication I/F 105, operator 107, light emitting diode (LED) 109, external recording medium 111, and power source 113.

Controller 101 is configured by using a central processing unit (CPU), a micro processing unit (MPU), or a digital signal processor (DSP), and performs signal processing for controlling the overall operation of each part of access point 10, data input and output processing with other parts, data arithmetic processing, and data storage processing.

Controller 101 performs various settings (for example, new registration of camera 30 capable of communicating with access point 10 and resetting of various setting information) based on, for example, an operation signal from operator 107.

In addition, controller 101 acquires the data of the captured video transmitted from camera 30 via wireless LAN communication I/F 105, writes the data in external recording medium 111, and records (that is, video recording) the data.

Further, controller 101 turns on or blinks LED 109 according to a turning-on or blinking pattern that corresponds to the operation state (for example, a state of being on and off the power source of access point 10 and a state of the presence or absence of access to external recording medium 111) of access point 10.

Wired LAN communication I/F 103 is wire-connected to router 20 using the wired LAN, such as Ethernet (registered trademark), and transmits and receives the data or information to and from router 20.

Wireless LAN communication I/F 105 is wirelessly connected to camera 30 using the wireless LAN, such as Wifi (registered trademark), and transmits and receives the data or information to and from camera 30.

Operator 107 receives the operation of the user with respect to access point 10 and sends an operation signal based on the operation to controller 101. For example, operator 107 includes a button for instructing new registration of camera 30 which is capable of communicating with access point 10 and a button for instructing reset (deletion) of various pieces of setting information.

Under the control of controller 101, LED 109 is turned on or blinked according to the turning-on or blinking pattern that corresponds to the operation state (for example, a state of being on and off the power source of access point 10 and a state of the presence or absence of access to external recording medium 111) of access point 10.

External recording medium 111 (an example of a storage) is configured by using a recording medium, such as a semiconductor memory (for example, an SD card), and records (that is, video recording) data of captured videos transmitted from camera 30 under the control of controller 101.

Power source 113 is constantly supplied with power from, for example, a commercial power source, and supplies the power necessary for each operation with respect to each part of access point 10.

Figure 4:
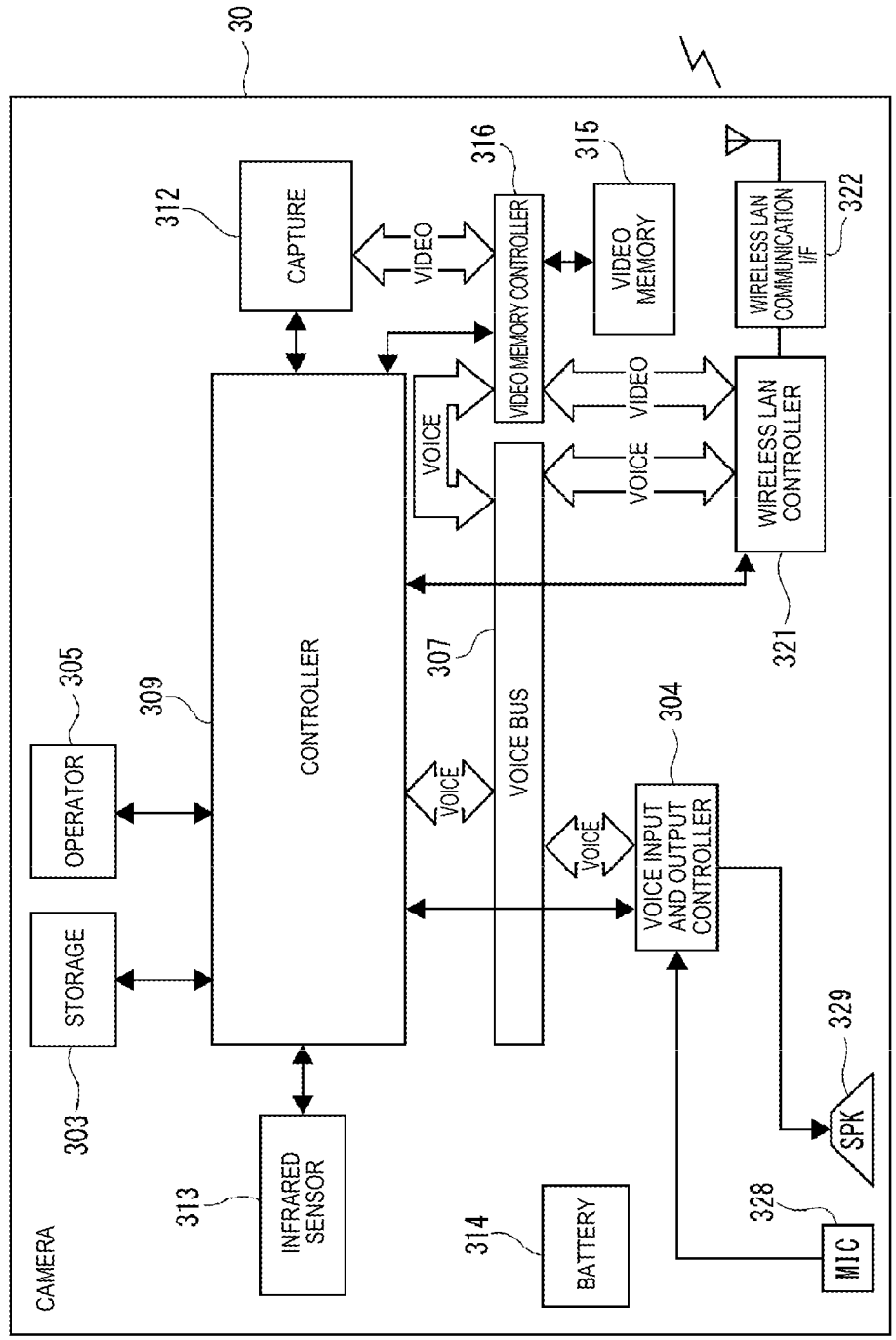
FIG. 4 is a block diagram illustrating an example of an inner configuration of the camera.

FIG. 4 is a block diagram illustrating an example of an inner configuration of camera 30. Camera 30 has a configuration including controller 309, storage 303, and operator 305, performs an operation related to imaging, and stores the operation in storage 303 or receives an input operation of a user or a third person (for example, a person who has approached the individual house of the user) in operator 305.

Storage 303 is configured using, for example, a random access memory (RAM) and a read only memory (ROM), holds programs and data necessary for the operation of camera 30 in the ROM, and temporarily holds data or information in the RAM when performing various types of processing using the program and data in controller 309. For example, storage 303 may temporarily buffer (store) the data of the captured video when buffering (refer to the description below) the data of the captured video performed after camera 30 shifts to the standby mode.

Operator 305 is configured by using buttons that can receive operations of the user or the third person (for example, a person who has approached the individual house of the user), and sends an operation signal based on the operation of the user or the third person to controller 309.

Controller 309 is configured using a processor (for example, a CPU, an MPU or a DSP), and performs signal processing for overall control of the operation of each part of camera 30, data input and output processing with other parts, data arithmetic processing, and data storage processing.

Controller 309 performs various types of setting (for example, setting of an angle of view defining the imaging area of camera 30) or processing based on the operation signal from operator 305.

Further, for example, when acquiring the shift instruction to the standby mode transmitted from access point 10 in the sleep mode, controller 309 shifts (that is, switches) the operation mode of camera 30 from the sleep mode to the standby mode.

Further, when controller 309 does not detect the person for a certain period of time after detecting the person (for example, a suspicious person who has approached the vicinity of the individual house of the user) by infrared sensor 313, controller 309 shifts (switches) the operation mode of camera 30 from the standby mode to the sleep mode.

Camera 30 has wireless LAN controller 321 and wireless LAN communication I/F 322. Using wireless LAN controller 321 and wireless LAN communication I/F 322, camera 30 transmits data of the captured video captured by camera 30 or data of voice collected by camera 30 to router 20 and smartphone 50 via access point 10 wirelessly connected by the wireless LAN. In addition, using wireless LAN controller 321 and wireless LAN communication I/F 322, camera 30 receives various types of data, information, or instructions related to the processing which are transmitted from smartphone 50 from router 20 or smartphone 50 via access point 10 wirelessly connected by the wireless LAN.

Camera 30 includes voice bus 307, voice input and output controller 304, speaker 329, and microphone 328, and performs calling processing by inputting and outputting the voice, for example, with smartphone 50. A voice signal (voice data) collected by microphone 328 is input to video memory controller 316 via voice bus 307, and is temporarily stored (buffered) or stored in video memory 315 as video together with the signal (data of captured image) of the captured image captured by capture 312. In addition, when transmitting the data of the captured video buffered or stored in video memory 315 to access point 10, camera 30 reads the data of the captured video from video memory 315 in video memory controller 316 and outputs the data to wireless LAN controller 321. Wireless LAN controller 321 transmits the data of the captured video read from video memory 315 to access point 10 via wireless LAN communication IT 322 and an antenna.

Camera 30 includes capture 312, video memory controller 316, and video memory 315, and stores the data of the captured video of the imaging area captured by capture 312 in video memory 315 via video memory controller 316. Capture 312 is configured using a lens and an imaging element (for example, an image sensor, such as a charged coupled device (CCD) or a complementary metal oxide semiconductor (CMOS). When buffering (refer to the description below) of the data of the captured video which is performed after camera 30 is shifted to the standby mode, video memory 315 temporarily buffers (stores) the data of the captured video.

As an example of a motion sensor, camera 30 integrally incorporates infrared sensor 313 (an example of a first sensor and a second sensor) which is a passive infra red (PIR) sensor. By detecting a change in heat (for example, infrared light) emitted from the person, infrared sensor 313 senses (detects) the presence of the person in a detection target region of predetermined infrared sensor 313. In a case of detecting the presence of the person in the detection target region, infrared sensor 313 sends a person detection notification to controller 309.

In the embodiment, although camera 30 is driven by battery 314, infrared sensor 313 operates not only in the standby mode but also in the sleep mode. In other words, infrared sensor 313 constantly operates while the power source of camera 30 is on even when the operation mode of camera 30 is in either the sleep mode or the standby mode, and senses the presence of the person in the detection target region.

Battery 314 supplies necessary electric power to each part of camera 30. Battery 314 is, for example, four D-size batteries used as a power source of camera 30. In addition, battery 314 may be a rechargeable secondary battery, such as a nickel hydrogen battery, a lithium ion battery, or a lead battery, as well as a primary battery, such as a manganese dry battery or an alkaline dry battery.

Next, regarding the operation of monitoring camera system 100 according to the embodiment, a first use case (refer to FIGS. 5A and 5B) and a second use case (refer to FIGS. 6A and 6B) will be described.

(First Use Case)

Figure 5A:
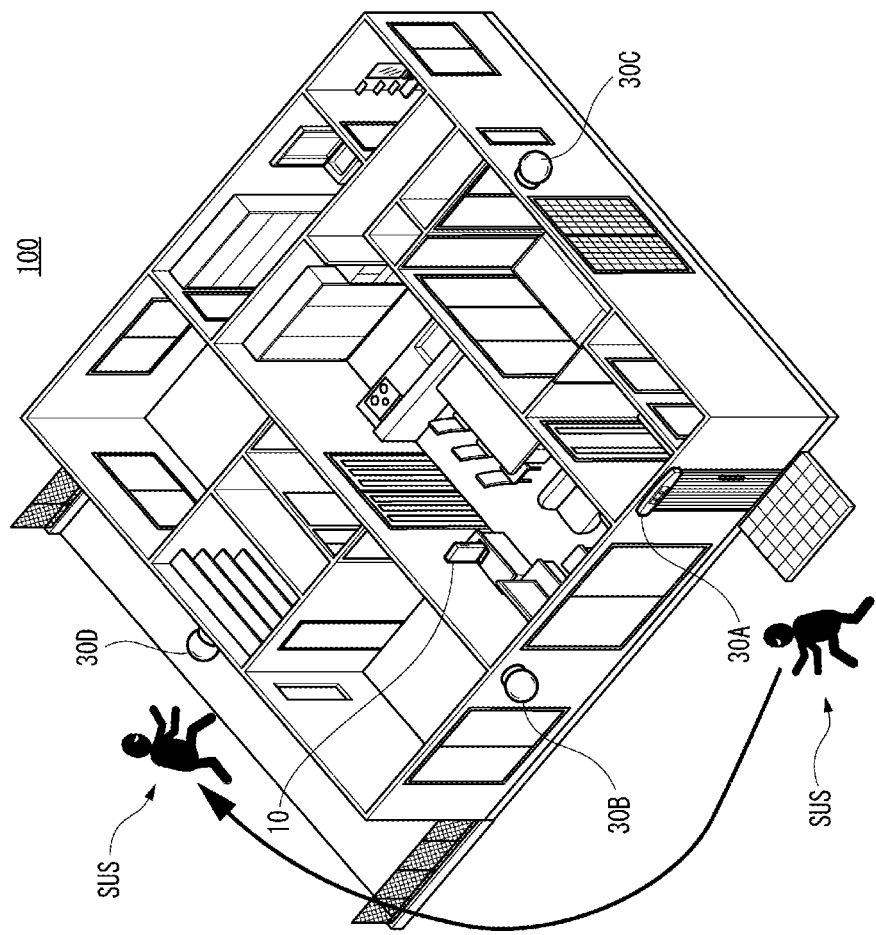
FIG. 5A is an explanatory view illustrating an example of an intrusion path when a suspicious person has gone into an imaging area of camera 2 after approaching an imaging area of camera 1.
Figure 5B:
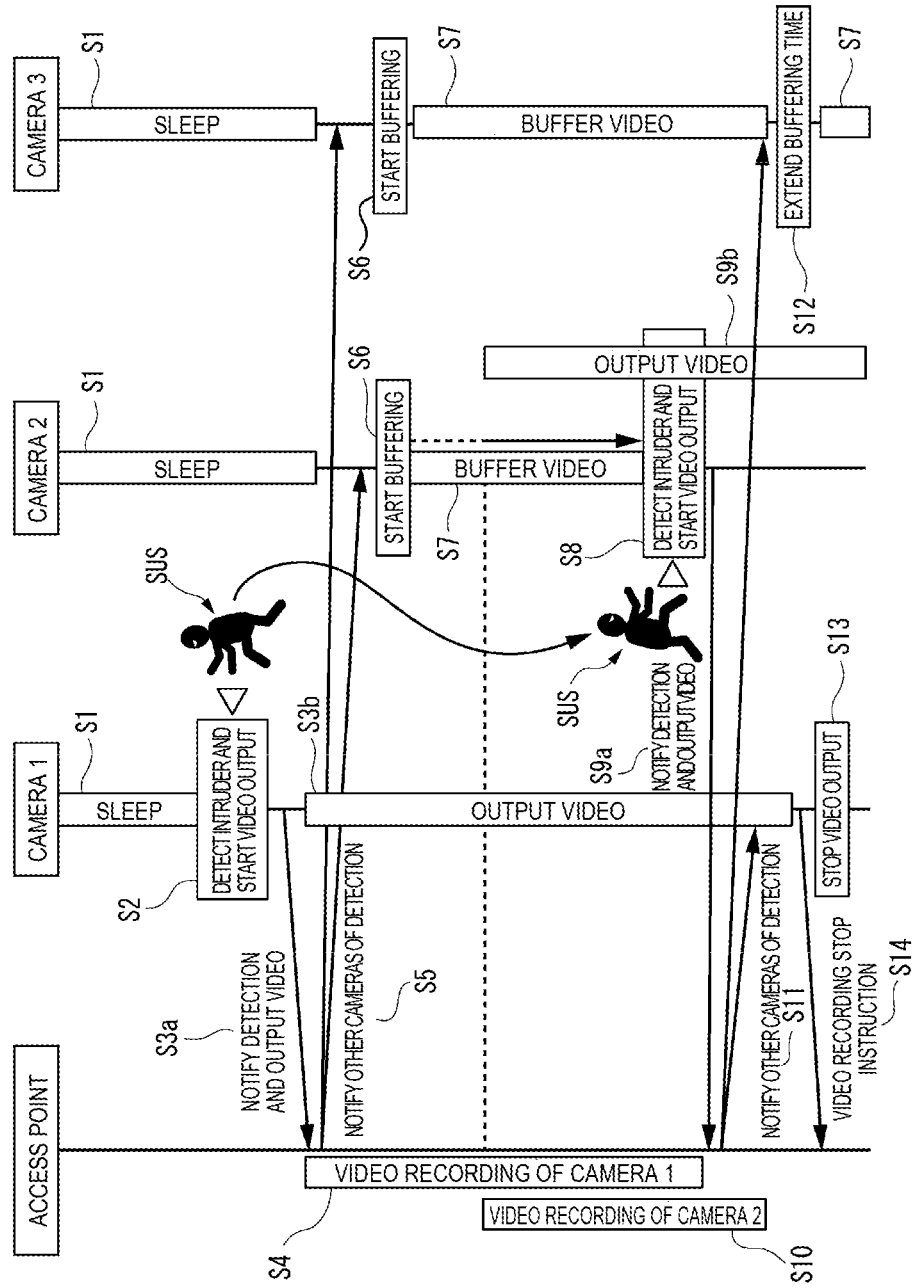
FIG. 5B is a sequence view illustrating an example of an operation order of the access point and each of the cameras which correspond to the intrusion path of the suspicious person illustrated in FIG. 5A.

FIG. 5A is an explanatory view illustrating an example of an intrusion path when suspicious person SUS has gone into an imaging area of camera 2 after approaching an imaging area of camera 1. FIG. 5B is a sequence view illustrating an example of an operation order of access point 10 and each of cameras 30 which correspond to the intrusion path of suspicious person SUS illustrated in FIG. 5A. In order to make it easy to understand the description of FIG. 5B, for example, camera 1 of FIG. 5B is camera 30A of FIG. 5A, camera 2 of FIG. 5B is camera 30D of FIG. 5A, and camera 3 of FIG. 5B is camera 30B of FIG. 5A, but the invention is not limited to the example of the combination of the cameras.

In FIG. 5A, an aspect in which suspicious person SUS unknown to the user approaches the entrance where camera 30A is installed around the individual house of the user where monitoring camera system 100 illustrated in FIG. 1 and FIG. 2 is installed, and then, intrudes the path that goes into the garden where camera 30D is installed, is illustrated.

In FIG. 5B, the power sources of all of cameras 1, 2, and 3 (that is, cameras 30A, 30D, and 30B) are turned on, but all of the cameras are in the sleep mode (S1).

While all of cameras 30 are in the sleep mode, suspicious person SUS (that is, an intruder into the site of the individual house of the user) approaches, for example, the imaging area (an example of the first imaging area) of camera 30A, and the presence of suspicious person SUS is detected by infrared sensor 313 of camera 30A (S2). When acquiring the detection notification indicating that suspicious person SUS has been detected by infrared sensor 313 in controller 309, camera 30A transmits the detection notification (an example of a first detection notification) to access point 10 (S3a) and the operation mode of camera 30A is shifted from the sleep mode to the standby mode in controller 309. In addition, after shifting the operation mode of camera 30A to the standby mode, camera 30A starts transmission of the data of the captured video of the imaging area of camera 30A captured by capture 312 to access point 10 (S3b). In addition, the processing in which camera 30A transmits the data of the captured video to access point 10 in step S3b continues, for example, until the person is not detected for a certain period of time (an example of a second predetermined time period) after suspicious person SUS is detected by camera 30A.

When receiving the data of the captured video sent from camera 30A in step S3b, access point 10 starts recording (that is, video recording) of the data of the captured video in external recording medium 111 in controller 101 (S4). In addition, when receiving the detection notification sent from camera 30A in step S3a, access point 10 notifies cameras (for example, camera 30D that corresponds to camera 2 and camera 30B that corresponds to camera 3) other than camera 30A of the shift instruction to the standby mode in accordance with the detection notification, respectively (S5).

When receiving the shift instruction to the standby mode sent from access point 10 in step S5, camera 30D that corresponds to camera 2 shifts the operation mode from the sleep mode to the standby mode in controller 309 in accordance with the shift instruction. Further, after shifting the operation mode of camera 30D to the standby mode, camera 30D starts buffering (so-called pre-recording) of the captured video of the imaging area (an example of the second imaging area) of camera 30D captured by capture 312 in controller 309 (S6), temporarily stores the buffered captured video in video memory 315, and continues the buffering of the captured video (S7). Accordingly, as will be described later, camera 30D can constantly store and hold the data of the captured video captured in a proximate predetermined time period (for example, several seconds, that is, an example of the first predetermined time period) earlier than the point of time (specifically, the point of time at which the processing of step S8 is performed) at which the data of the captured video of the imaging area of camera 30D is transmitted to access point 10.

Similarly, when receiving the shift instruction to the standby mode sent from access point 10 in step S5, camera 30B that corresponds to camera 3 shifts the operation mode from the sleep mode to the standby mode in controller 309 in accordance with the shift instruction. Further, after shifting the operation mode of camera 30B to the standby mode, camera 30B starts buffering (so-called pre-recording) of the captured video of the imaging area (an example of the third imaging area) of camera 30B captured by capture 312 in controller 309 (S6), temporarily stores the buffered captured video in video memory 315, and continues the buffering of the captured video (S7). Accordingly, camera 30B can constantly store and hold the data of the captured video captured in a proximate predetermined time period (for example, several seconds, that is, an example of the first predetermined time period) earlier than the point of time at which the data of the captured video of the imaging area of camera 30B is transmitted to access point 10.

Here, in a case where suspicious person SUS goes into the garden where camera 30D is installed from the vicinity of the entrance where camera 30A is installed, suspicious person SUS is detected by infrared sensor 313 of camera 30D (S8). When acquiring the detection notification indicating that suspicious person SUS has been detected by infrared sensor 313 in controller 309, camera 30D transmits the detection notification (an example of the second detection notification) to access point 10 (S9a), the transmission of the data of the captured video of the imaging area of camera 30D buffered after step S6 to access point 10 is started (S9b). In addition, the processing in which camera 30D transmits the data of the captured video to access point 10 in step S9b continues, for example, until the person is not detected for a certain period of time (an example of the second predetermined time period) after suspicious person SUS is detected by camera 30D. Here, the characteristic feature of the embodiment is that, in step S9b, camera 30D transmits not only the data of the captured video after suspicious person SUS is detected in step S8, but also the data of the captured video before a predetermined time period (for example, several seconds, that is, an example of the first predetermined time period) during which the buffering is already performed earlier than the point of time at which suspicious person SUS is detected, to access point 10. Accordingly, camera 30D can transmit the data of the captured video before the point of time at which suspicious person SUS is detected at the point of time of step S8 (that is, while suspicious person SUS is approaching the imaging area of camera 30D) to access point 10 and record the data in access point 10.

When receiving the data of the captured video sent from camera 30D in step S9a, access point 10 starts the recording (that is, video recording) of the data of the captured video in external recording medium 111 in controller 101 (S10). As described above, access point 10 can record (that is, video recording) the data of the captured video before the point of time at which camera 30D detects suspicious person SUS at the point of time of step S8 (that is, while suspicious person SUS is approaching the imaging area of camera 30D). Therefore, access point 10 can store the captured video that can specify an action, for example, when suspicious person SUS goes into the site of the individual house from the imaging area of camera 30A and approaches the imaging area of camera 30D, it is possible to effectively perform efficient monitoring of the individual house of the user as a monitoring area. Further, when receiving the detection notification sent from camera 30D in step S9a, access point 10 transfers and notifies other cameras (for example, camera 30A that corresponds to camera 1 and camera 30B that corresponds to camera 3) of the detection notification, respectively (S11).

It is determined that camera 30B extends the buffering time of the captured video started in step S7 in controller 309 (S12) when receiving the detection notification (that is, the notification indicating that suspicious person SUS is detected in the imaging area of camera 30D) transferred in step S11. In other words, since suspicious person SUS is detected by another camera (camera 30D in the example of FIG. 5B) installed on the outer wall or the like of the individual house of the user, there is a possibility that suspicious person SUS still remains around the individual house of the user, and thus, the buffering of the captured video is continued in other cameras (for example, camera 30B) where suspicious person SUS has not approached the imaging area yet (S7).

Meanwhile, in a case where camera 30A no longer detects the person (for example, suspicious person SUS) for a certain period of time (an example of the second predetermined time period) after detecting suspicious person SUS in step S2, camera 30A stops transmission of the data of the captured video captured by capture 312 to access point 10 in controller 309 (S13), and further transmits a video recording stop instruction for stopping the recording of the data of the captured video of camera 30A to access point 10 (S14). Accordingly, in accordance with the video recording stop instruction transmitted from camera 30A in step S14, access point 10 can stop the recording (that is, video recording) of the data of the captured video captured by camera 30A in external recording medium 111, and thus, for example, when performing the monitoring, it is possible to effectively suppress an increase or tightening of the recording capacity based on the video recording of the data of the captured video in a state where the need for recording is low (for example, a state where there is no person). In addition, although not illustrated in FIG. 5B, since camera 30A does not detect the person (for example, suspicious person SUS) around camera 30A for a certain period of time (an example of the second predetermined time period), the operation mode may be shifted from the standby mode to the sleep mode immediately after S14. Accordingly, it is possible to suppress an increase in power consumption of camera 30A.

(Second Use Case)

FIG. 6A is an explanatory view illustrating an example of the intrusion path when suspicious person SUS does not approach the other cameras and goes away from the individual house after approaching the imaging area of camera 1. FIG. 6B is a sequence view illustrating an example of an operation order of access point 10 and each of cameras 30 which correspond to the intrusion path of suspicious person SUS illustrated in FIG. 6A. In order to make it easy to understand the description of FIG. 6B, for example, camera 1 of FIG. 6B is camera 30A of FIG. 6A, camera 2 of FIG. 6B is camera 30D of FIG. 6A, and camera 3 of FIG. 6B is camera 30B of FIG. 6A, but the invention is not limited to the example of the combination of the cameras. In addition, in the description of FIG. 6B, the same step numbers are assigned to the same processing as the processing of FIG. 5B, the description will be simplified or omitted, and different contents will be described.

In FIG. 6A, an aspect in which suspicious person SUS unknown to the user approaches the entrance where camera 30A is installed around the individual house of the user where monitoring camera system 100 illustrated in FIG. 1 and FIG. 2 is installed, and then, runs away to escape from the individual house, is illustrated.

In FIG. 6B, the power sources of all of cameras 1, 2, and 3 (that is, cameras 30A, 30D, and 30B) are turned on, but all of the cameras are in the sleep mode (S1).

As illustrated in FIG. 6A, since suspicious person SUS ran away to escape from the individual house after being detected in the imaging area of camera 30A, suspicious person SUS was not detected by any of camera 30A, 30D, and 30B after suspicious person SUS is detected in step S2.

Therefore, since camera 30A no longer detects the person (for example, suspicious person SUS) for a certain period of time (an example of the second predetermined time period) after detecting suspicious person SUS in step S2, camera 30A stops the transmission of the data of the captured video captured by capture 312 to access point 10 in controller 309 (S13), and further transmits the video recording stop instruction for stopping the recording of the data of the captured video of camera 30A to access point 10 (S14). Accordingly, in accordance with the video recording stop instruction transmitted from camera 30A in step S14, access point 10 stops recording (that is, video recording) of the data of the captured video captured by camera 30A in external recording medium 111. In addition, camera 30A shifts the operation mode from the standby mode to the sleep mode (S1) immediately after step S14. Accordingly, it is possible to suppress an increase in power consumption of camera 30A.

Similarly, since camera 30D no longer detects the person (for example, suspicious person SUS) for a certain period of time (an example of the third predetermined time period) after starting the buffering of the data of the captured video of the imaging area (an example of the second imaging area) of camera 30D in step S6, camera 30D stops the buffering of the data of the captured video which was continued in step S7 (S21). In addition, camera 30D shifts the operation mode from the standby mode to the sleep mode immediately after stopping the buffering of the data of the captured video (S1). Accordingly, since a state where no one is around continues for a certain period of time, camera 30D can stop unnecessary buffering of the data of the captured video and can be shifted to the sleep mode, and accordingly, it is possible to suppress an increase in power consumption in camera 30D.

Similarly, since camera 30B no longer detects a person (for example, suspicious person SUS) for a certain period of time (an example of the third predetermined time period) after starting the buffering of the data of the captured video of the imaging area (an example of the third imaging area) of camera 30B in step S6, camera 30B stops the buffering of the data of the captured video which was continued in step S7 (S21). In addition, camera 30B shifts the operation mode from the standby mode to the sleep mode immediately after stopping the buffering of the data of the captured video (S1). Accordingly, since a state where no one is around continues for a certain period of time, camera 30B can stop unnecessary buffering of the data of the captured video and can be shifted to the sleep mode, and accordingly, it is possible to suppress an increase in power consumption in camera 30B.

Above, in monitoring camera system 100 according to the embodiment, the plurality of cameras 30 (for example, cameras 30A, 30B, 30C, and 30D) and access point 10 which controls the operation modes of each of the cameras 30 can communicate with each other. When camera 30A (an example of the first camera) among the plurality of cameras 30 detects the person (for example, suspicious person SUS) in the imaging area of camera 30A, camera 30A sends the person detection notification (an example of the first detection notification) to access point 10, shifts the operation mode from the sleep mode to the standby mode, and starts the transmission of the captured video of the imaging area of camera 30A to access point 10. In accordance with the detection notification sent from camera 30A, access point 10 notifies cameras 30 (for example, cameras 30B, 30C, and 30D) other than camera 30A among the plurality of cameras 30 of the shift instruction to the standby mode. In accordance with the shift instruction to the standby mode sent from access point 10, other cameras 30 shift the operation mode from the sleep mode to the standby mode, and starts the buffering of the captured video of the imaging area (an example of the second imaging area) of the other cameras. In addition, when detecting the person (for example, suspicious person SUS) in the imaging area of other cameras 30 in the standby mode, other cameras 30 send the person detection notification (an example of the second detection notification) to access point 10, and starts the transmission of the captured video of the imaging area of other cameras 30 including the captured video buffered before a predetermined time period (an example of the first predetermined time period) after the point of time at which the person is detected by the imaging area of other cameras 30, to access point 10.

Accordingly, monitoring camera system 100 does not always operate each of the plurality of cameras 30, and when it is necessary to monitor each of cameras 30 (for example, when suspicious person SUS is detected in the imaging area of any of cameras 30A), it is possible to perform efficient control to shift (that is, activate) the operation mode from the sleep mode to the standby mode. Therefore, monitoring camera system 100 can improve the usability of monitoring camera system 100 by performing efficient monitoring while reducing the power consumption of all of cameras 30 which configure monitoring camera system 100.

Further, camera 30A has infrared sensor 313 (an example of a first sensor) capable of detecting the person (for example, suspicious person SUS) in the sleep mode, and infrared sensor 313 detects the person in the imaging area of camera 30A. Similarly, other cameras 30 have infrared sensor 313 (an example of a second sensor) capable of detecting the person (for example, suspicious person SUS) in the sleep mode, and infrared sensor 313 detects the person in the imaging area of other cameras 30. Accordingly, since each of cameras 30 which configure monitoring camera system 100 detects the person (for example, a suspicious person) by infrared sensor 313 as a minimum operation even when camera 30 is in the sleep mode, even when cameras 30 are configured by driving of battery 314, an increase in power consumption is suppressed and necessary minimum monitoring is performed.

In addition, access point 10 starts recording of the captured video of the imaging area of camera 30A sent from camera 30A in external recording medium 111. Access point 10 starts the recording of the captured video of the imaging area of other cameras 30 which is sent from other cameras 30 and includes the captured video buffered before a predetermined time period after the point of time at which the person (for example, suspicious person SUS) is detected, to external recording medium 111. Accordingly, access point 10 can record (that is, video recording) the data of the captured video before the point of time at which other cameras 30 (for example, camera 30D) detects suspicious person SUS (that is, while suspicious person SUS is approaching the imaging area of camera 30D). Therefore, access point 10 can store the captured video that can specify an action, for example, when suspicious person SUS goes into the site of the individual house from the imaging area of camera 30A and approaches the imaging area of camera 30D, it is possible to effectively perform efficient monitoring of the individual house of the user as a monitoring area.

Further, in a case where camera 30A no longer detects the person for a predetermined time period (an example of the second predetermined time period) after detecting the person (for example, suspicious person SUS), camera 30A transmits the recording stop instruction (one example of the video recording stop instruction) of the captured video of the imaging area of camera 30A to access point 10. In accordance with recording stop instruction sent from camera 30A, access point 10 stops recording the captured video of the imaging area of camera 30A in external recording medium 111. Accordingly, since access point 10 can stop the recording (that is, video recording) of the data of the captured video captured by camera 30A in external recording medium 111 in accordance with the video recording stop instruction (one example of the recording stop instruction) transmitted from camera 30A, for example, when performing the monitoring, it is possible to effectively suppress an increase or tightening of the recording capacity based on the video recording of the data of the captured video in a state where the need for recording is low (for example, a state where there is no person).

Further, other cameras 30 includes camera 30D (an example of the second camera) which images the second imaging area and camera 30B (an example of the third camera) which images the third imaging area. Access point 10 transfers the detection notification sent from the camera 30D to camera 30B. In accordance with the detection notification transferred from access point 10, camera 30B continues buffering by extending the buffering time for buffering the data of the captured video of the imaging area of the camera 30B. Accordingly, since suspicious person SUS is newly detected by other cameras (for example, camera 30D) installed on the outer wall or the like of the individual house of the user, there is a possibility that suspicious person SUS still remains around the individual house, and thus, even in a case where suspicious person SUS approaches the imaging area of camera 30B where the suspicious person SUS has not yet approached, camera 30B can buffer all of the details in which the person approaches the imaging area as the captured video and record the buffered captured video in access point 10.

In addition, in a case where other cameras 30 do not detect the person for a certain period of time (one example of the third predetermined time period) after starting the buffering of the data of the captured video by receiving the person (for example, suspicious person SUS) detection notification transmitted from access point 10, the buffering of the captured video of the imaging area of other cameras 30 is stopped. Accordingly, since a state where no one exists around other cameras 30 continues for a certain period of time, other cameras 30 can stop unnecessary buffering of the data of the captured video and can shift the operation mode to the sleep mode, and accordingly, it is possible to suppress an increase in power consumption in other cameras 30.

Above, while the embodiments according to the disclosure have been described with reference to the drawings, it is needless to say that the disclosure is not limited to the examples. It is apparent for those skilled in the art that various modification examples or correction examples can be conceived within the scope described in the claims and those skilled in the art understand that the examples naturally fall within the technical scope of the disclosure. Further, within the scope not departing from the gist of the invention, each of the configuration elements in the above-described embodiment may be combined in any manner.

For example, in the above-described embodiment, as an example of the master device which configures the monitoring camera system according to the disclosure, access point 10 has a function of controlling the operation mode of each of cameras 30 that configure monitoring camera system 100 and recording (video recording) the data of the captured video transmitted from each of cameras 30 (hereinafter, referred to as "master device function"). However, the master device function may be provided, for example, in any camera 30 among the plurality of cameras 30 that configure monitoring camera system 100. In this case, in monitoring camera system 100, the configuration of access point 10 can be omitted in the system configuration illustrated in FIG. 2, and the system configuration can further be simplified.

Further, for example, in the above-described embodiment, all of cameras 30 which configure monitoring camera system 100 may share the above-described master device functions (that is, both the video recording function and the notification function which will be described later). The sharing method is not particularly limited, but for example, the functions may be shared in a time-division manner between each of cameras 30 at predetermined time intervals, or may be sequentially shared by a specific plurality of cameras 30 in advance by turns. Even in this case, monitoring camera system 100 can further simplify the system configuration by making it possible to omit the configuration of access point 10 in the system configuration illustrated in FIG. 2, and can avoid a case of having all of the master device functions only in specific camera 30, and thus, it is possible to suppress an increase in the processing load on specific camera 30 or the capacity of video memory 315.

In addition, the master device function (that is, the video recording function and the notification function) themselves may be shared. As an example, each of cameras 30 respectively has the video recording function (that is, a function of recording the data of the captured video captured by the camera itself) therein, and further, may share a function of sharing the notification function (that is, a function of notifying of the instruction for shifting the operation mode to the sleep mode or the standby mode) with respect to other cameras 30 in a time-division manner between each of cameras 30 by turns. Accordingly, monitoring camera system 100 can further simplify the system configuration by making it possible to omit the configuration of access point 10 in the system configuration illustrated in FIG. 2, and can avoid a case of having all of the master device functions only in specific camera 30, and thus, it is possible to suppress an increase in the processing load on specific camera 30 or the capacity of video memory 315.

What is claimed is:

1. A monitoring camera system in which a plurality of cameras and a master device which controls an operation mode of each of the cameras are capable of communicating with each other,
wherein a first camera among the plurality of cameras sends a first detection notification of a person to the master device when detecting the person in a first imaging area, and starts transmission of a captured video of the first imaging area to the master device by shifting the operation mode from a sleep mode to a standby mode,
wherein the master device notifies a camera other than the first camera among the plurality of cameras of a shift instruction to the standby mode in accordance with the first detection notification sent from the first camera, and
wherein the other camera shifts the operation mode from the sleep mode to the standby mode in accordance with the shift instruction to the standby mode sent from the master device, and starts buffering of a captured video of a second imaging area, and when detecting the person in the second imaging area in the standby mode, the other camera sends a second detection notification of the person to the master device, and starts transmission of a captured video of the second imaging area including the captured video buffered before a first predetermined time period after a point of time at which the person is detected in the second imaging area, to the master device.

2. The system of claim 1,
wherein the first camera includes a first sensor which is capable of detecting the person in the sleep mode, and detects the person in the first imaging area by the first sensor, and
wherein the other camera includes a second sensor which is capable of detecting the person in the sleep mode, and detects the person in the second imaging area by the second sensor.

3. The system of claim 1,
wherein the master device starts recording of the captured video of the first imaging area sent from the first camera, in a storage, and
wherein the master device starts recording of the captured video of the second imaging area including the captured video buffered before the first predetermined time period, sent from the other camera, in the storage.

4. The system of claim 3,
wherein the first camera transmits a recording stop instruction of the captured video of the first imaging area to the master device in a case where the person is not detected during a second predetermined time period after detecting the person, and
wherein the master device stops the recording of the captured video of the first imaging area in the storage in accordance with the recording stop instruction sent from the first camera.

5. The system of claim 1,
wherein the other camera includes a second camera for imaging the second imaging area and a third camera for imaging a third imaging area,
wherein the master device transfers the second detection notification sent from the second camera to the third camera, and
wherein the third camera extends buffering time for buffering a captured video of the third imaging area and continues the buffering in accordance with the second detection notification transferred from the master device.

6. The system of claim 1,
wherein the other camera stops the buffering of the captured video of the second imaging area in a case where the person is not detected for a third predetermined time period after starting the buffering.

7. A monitoring method which uses a monitoring camera system in which a plurality of cameras and a master device which controls an operation mode of each of the cameras are capable of communicating with each other,
wherein a first camera among the plurality of cameras sends a first detection notification of a person to the master device when detecting the person in a first imaging area, and starts transmission of a captured video of the first imaging area to the master device by shifting the operation mode from a sleep mode to a standby mode,
wherein the master device notifies a camera other than the first camera among the plurality of cameras of a shift instruction to the standby mode in accordance with the first detection notification sent from the first camera, and
wherein the other camera shifts the operation mode from the sleep mode to the standby mode in accordance with the shift instruction to the standby mode sent from the master device, and starts buffering of a captured video of a second imaging area, and when detecting the person in the second imaging area in the standby mode, the other camera sends a second detection notification of the person to the master device, and starts transmission of the captured video of the second imaging area buffered before a first predetermined time period after a point of time at which the person is detected in the second imaging area, to the master device.

* * * * *